June 11, 1957 L. C. GETSINGER 2,795,099
CRANBERRY HARVESTING MACHINE
Filed May 20, 1954
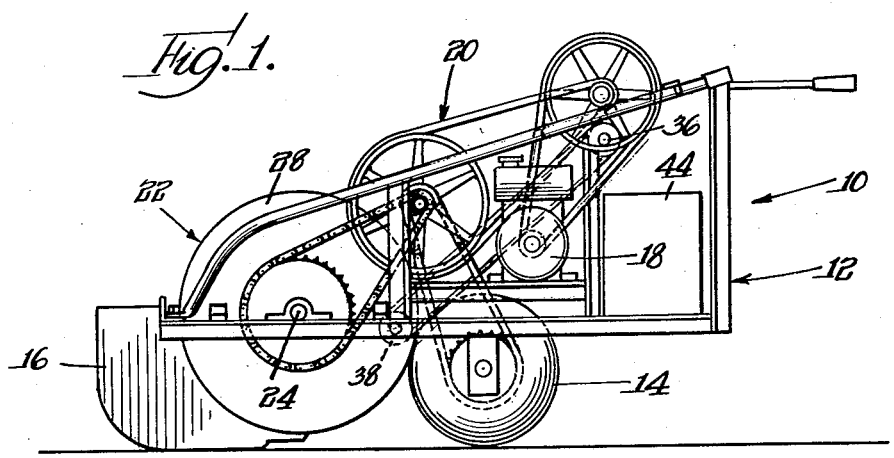
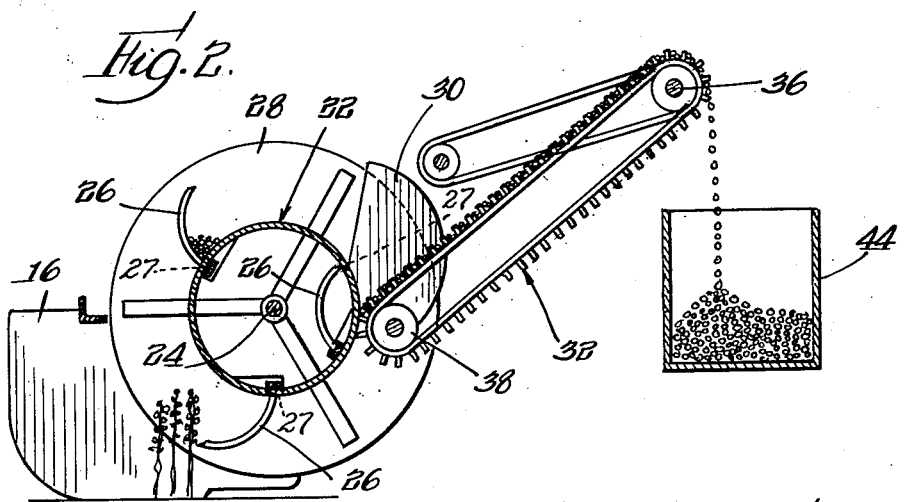
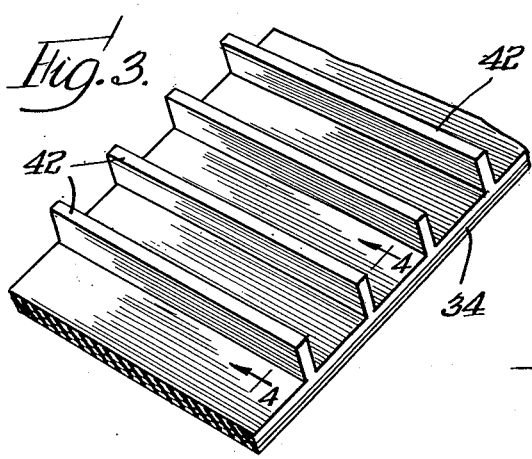
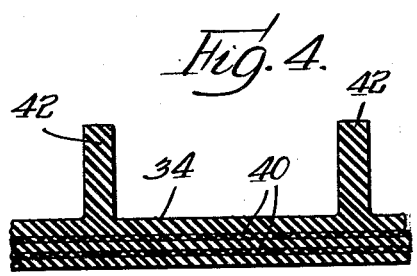
INVENTOR.
Leonard C. Getsinger
BY
Olson & Trexler
attys.

United States Patent Office 2,795,099
Patented June 11, 1957

2,795,099

CRANBERRY HARVESTING MACHINE

Leonard C. Getsinger, Wisconsin Rapids, Wis.

Application May 20, 1954, Serial No. 431,179

2 Claims. (Cl. 56—330)

The present invention relates to a novel harvesting apparatus and more particularly a novel apparatus especially adapted for harvesting crops such as cranberries and the like.

It has heretofore been suggested that cranberries and like crops may be harvested by utilizing an apparatus including a rotatable drum carrying retractable picking fingers, a blade or chute positioned against the drum for receiving the berries therefrom and an endless conveyor for receiving the berries from the chute. While for the most part this prior apparatus operates satisfactorily it has been found that material such as loose pieces of cranberry vines, hay, grass or the like sometimes becomes wedged between the drum and the chute so that operation of the apparatus must be halted until such material has been removed. It is therefore a primary object of the present invention to overcome the above mentioned difficulty by providing a novel apparatus wherein the cranberries and any foreign material are continuously swept from the harvesting drum so as to prevent fouling of the drum.

Another object of the present invention is to provide a novel apparatus of the above described type wherein the cranberries and the like are swept from the harvesting drum without any substantial danger of crushing or bruising the berries.

A more specific object of the present invention is to provide an apparatus of the above described general type with novel conveyor means capable of removing cranberries and the like from a harvesting drum and transporting the berries without injury thereto.

Other objects and advantages of the present invention will become apparent from the following description and the accompanying drawing wherein:

Fig. 1 is a side elevational view of an apparatus embodying the principles of this invention;

Fig. 2 is an enlarged fragmentary elevational view with parts broken away and shown in section, showing the novel features of the present invention more clearly;

Fig. 3 is an enlarged fragmentary perspective view showing a portion of the novel conveyor means of the present invention; and Fig. 4 is an enlarged fragmentary cross sectional view taken along line 4—4 in Fig. 3.

Referring now more specifically to the drawings wherein like parts are designated by the same numerals throughout the various figures, a harvesting machine 10 embodying the principles of this invention is shown best in Fig. 1 and includes a frame structure generally designated by the numeral 12, which frame structure is supported for movement by means of wheels 14 disposed at opposite sides thereof and skids 16. A motor 18 is mounted on the frame for driving the wheels 14 through suitable drive means generally designated by the numeral 20.

In order to harvest the cranberries and the like a drum 22 is rotatably mounted on the frame by means of a horizontal shaft 24. A plurality of rows of picking fingers 26 are provided and these picking fingers are mounted by suitable means, not shown, for oscillating movement through suitable apertures 27 in the otherwise uninterrupted surface of the drum 22. Annular plate members 28 are secured to opposite ends of the drum for retaining berries picked by the fingers 26 on the drum and stationary baffle members 30 are mounted on the frame structure adjacent opposite ends of the drum for directing the berries on the drum toward conveyor means 32 which will be described in detail below. The harvesting drum is also driven by the drive means 20 and for the details of this drive means reference is made to my copending application Serial No. 331,079 filed January 13, 1953, now Patent No. 2,696,706. Reference is also made to this patent for the details of the apparatus frame structure and the details of the harvesting drum and more particularly for the details of the mechanism for extending and retracting the picking fingers upon rotation of the harvesting drum.

In accordance with the present invention the conveyor means 32 includes an endless belt 34 which is wrapped around rollers 36 and 38 suitably mounted on the apparatus frame. The roller 36 is also driven by the drive means 20 so that the belt 34 moves continuously while the harvesting drum is rotated. The belt 34 is formed from a continuous sheet of rubber or other flexible rubber-like material and, as shown best in Fig. 4, a plurality of spaced layers of reinforcing fabric 40 are embedded in the rubber or rubber-like material of the belt. These reinforcing fabric layers are preferably formed of fibrous material but it is understood that they may be formed of any other suitable material. In accordance with the present invention a plurality of transversely extending ribs or cleats 42 are spaced along the belt 34 and preferably formed integrally therewith. As shown best in Fig. 2, the roller 38 is positioned such that the upper flight of the conveyor 32 is disposed substantially in the vicinity of a horizontal plane through the axis of rotation of the drum 22 so that the harvested crop has a tendency to fall from the drum to the conveyor and the cleats or ribs 42, which are also formed of flexible rubber or rubber-like material, project sufficiently from the belt 34 to engage the surface of the harvesting drum 22. Thus, as the belt 34 is driven the cleats or ribs not only catch the cranberries or the like coming from the harvesting drum but also serve to sweep the surface of the drum and remove any hay, straw or other foreign material therefrom. As shown best in Figs. 2 and 3, the cleats or ribs 42 which along with the belt 34 form berry receiving pockets, are positioned sufficiently close together so that at least one of the ribs blocks the space between the surface of the belt 34 and the peripheral surface of the harvesting drum at all times to prevent the passage of any of the crop through such space. It is important to note that the ribs or cleats 42 tend to catch the falling crop, with little or no tendency to press the crop against the drum, and are flexible so as to further reduce any possibility of the berries being crushed or bruised by the cleats as they would be if the cleats were formed from a rigid material such as wood or metal.

A short description of the operation of the above described apparatus in as follows. The motor 18 is, of course, first started so that the harvesting drum and the conveyor are continuously driven. Then as the operator guides the apparatus across a field in which the crop to be harvested is growing, the picking fingers 26 dip into cranberry vines and strip the cranberries therefrom. As the harvesting drum rotates, the harvested berries are carried by the fingers upwardly and over the top of the drum. After the harvesting fingers have reached the uppermost position on the drum they begin to retract within the drum to avoid interference with the conveyor and the berries are deposited on the surface of the drum.

The berries then fall onto the conveyor 32 which receives and conveys the berries in the pockets formed by the ribs 42 and also serves to sweep the peripheral surface of the drum in the manner described above. The conveyor which is arranged at an angle to the horizontal transports the berries upwardly and finally discharges the berries into a box or other suitable container 44 removably carried on the frame of the apparatus.

From the above description it is seen that the present invention has provided a novel harvesting apparatus which includes simple and highly efficient means for not only receiving and conveying the harvested crop such as cranberries from the harvesting drum but which also serves to clean the surface of the harvesting drum so as to prevent fouling thereof. More specifically, it is seen that the present invention has provided a harvesting apparatus having a novel flexible conveyor which is capable of sweeping cranberries and any foreign material from the surface of the harvesting drum without any substantial danger of bruising or otherwise injuring the berries.

While the preferred embodiment of the present invention has been shown and described herein it is obvious that many structural details may be changed without departing from the spirit and scope of the appended claims.

The invention is claimed as follows:

1. A harvesting machine comprising a mobile frame, a drum rotatably mounted on said frame and having a plurality of spaced apertures therethrough, a plurality of finger means carried by the drum and movable through the apertures in the peripheral surface of said drum to and from extended and retracted positions for collecting the crop being harvested and depositing the crop on said drum, and endless conveyor means carried by said frame for receiving the crop from said drum, said conveyor means including an endless belt having a portion thereof disposed adjacent the peripheral surface of said drum and substantially in the vicinity of a horizontal plane through the axis of rotation of the drum whereby the crop tends to fall from the drum to the conveyor, and said conveyor means also including a plurality of transversely extending flexible ribs spaced along the belt distances such that at least one rib extends between the belt and the peripheral surface of the drum at all times sufficiently to prevent the passage of the harvested crop between the belt and the drum and said ribs providing with the belt a plurality of pockets for successively receiving the harvested crop from the drum.

2. A harvesting machine as claimed in claim 1, wherein the portion of the conveyor adjacent the drum is positioned so that the upper flight of the conveyor is disposed substantially along the horizontal plane through the axis of rotation of the drum, and wherein the ribs extend from the belt a distance such that the ribs will engage and sweep the surface of the drum for cleaning thereof.

References Cited in the file of this patent

UNITED STATES PATENTS

| | | |
|---|---|---|
| 889,968 | Rickey | June 9, 1908 |
| 999,419 | Van Wert | Aug. 1, 1911 |
| 1,035,485 | Sletto | Aug. 13, 1912 |
| 1,116,092 | McIntire | Nov. 3, 1914 |
| 1,122,802 | Quantrell | Dec. 29, 1914 |
| 1,432,002 | Wentz | Oct. 17, 1922 |
| 1,449,869 | Novak | Mar. 27, 1923 |
| 1,484,248 | Austin | Feb. 19, 1924 |
| 1,707,878 | Roosa | Apr. 2, 1929 |
| 1,908,082 | Tinsley | May 3, 1933 |
| 2,305,044 | Toews | Dec. 15, 1942 |
| 2,607,180 | Stankavick et al. | Aug. 19, 1952 |
| 2,615,295 | Sishc | Oct. 28, 1952 |